(12) United States Patent
Kang et al.

(10) Patent No.: US 12,284,259 B2
(45) Date of Patent: Apr. 22, 2025

(54) NATIVE COMPUTING POWER SERVICE IMPLEMENTATION METHOD AND APPARATUS, NETWORK DEVICE, AND TERMINAL

(71) Applicant: VIVO MOBILE COMMUNICATION CO., LTD., Dongguan (CN)

(72) Inventors: Yanchao Kang, Dongguan (CN); Fei Qin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/237,896

(22) Filed: Aug. 24, 2023

(65) Prior Publication Data

US 2023/0403342 A1    Dec. 14, 2023

Related U.S. Application Data

(63) Continuation of application No. PCT/CN2022/077974, filed on Feb. 25, 2022.

(30) Foreign Application Priority Data

Feb. 26, 2021   (CN) .......................... 202110217692.5

(51) Int. Cl.
*H04L 67/60*   (2022.01)
*G06F 1/26*    (2006.01)

(52) U.S. Cl.
CPC .............. *H04L 67/60* (2022.05); *G06F 1/26* (2013.01)

(58) Field of Classification Search
CPC ......... H04W 52/0261; H04W 52/0258; H04W 52/0235; G06F 2209/503; G06F 9/4881
See application file for complete search history.

(56) References Cited

U.S. PATENT DOCUMENTS

| | | | |
|---|---|---|---|
| 6,859,819 B1 | 2/2005 | Rosenberg et al. | |
| 8,405,505 B2 * | 3/2013 | Desai | H04W 52/0258 340/539.3 |
| 9,961,641 B2 * | 5/2018 | Yang | H04W 52/0261 |
| 2012/0290725 A1 * | 11/2012 | Podila | G06F 9/5011 709/226 |
| 2017/0134889 A1 * | 5/2017 | Stroud | G05B 15/02 |

(Continued)

FOREIGN PATENT DOCUMENTS

| | | |
|---|---|---|
| CN | 101110833 A | 1/2008 |
| CN | 108512878 A | 9/2018 |

(Continued)

OTHER PUBLICATIONS

International Search Report issued in corresponding International Application No. PCT/CN2022/077974, mailed May 13, 2022, 6 pages.

(Continued)

*Primary Examiner* — Chirag R Patel
(74) *Attorney, Agent, or Firm* — IPX PLLC

(57) ABSTRACT

The present application discloses a native computing power service implementation method and apparatus, a network device, and a terminal. The method includes: performing logical interaction for native computing power service with (Continued)

S201

Perform logical interaction for native computing power service with a terminal through a user plane, and provide the terminal with a native computing power service that meets a computing power resource requirement of the terminal a terminal through a user plane, and providing the terminal with a native computing power service that meets a computing power resource requirement of the terminal.

20 Claims, 8 Drawing Sheets

(56) References Cited

U.S. PATENT DOCUMENTS

| | | | | |
|---|---|---|---|---|
| 2017/0235357 | A1* | 8/2017 | Leung | G06F 1/3212 |
| | | | | 713/310 |
| 2017/0343973 | A1* | 11/2017 | Kitaji | H02J 3/144 |
| 2019/0384643 | A1* | 12/2019 | Gao | G06F 9/5022 |
| 2020/0015311 | A1* | 1/2020 | Kim | H04W 68/005 |
| 2020/0053546 | A1 | 2/2020 | Panchal et al. | |
| 2021/0076192 | A1* | 3/2021 | Wu | H04L 67/53 |
| 2022/0417821 | A1* | 12/2022 | Xu | H04W 72/23 |
| 2024/0063896 | A1* | 2/2024 | Catovic | H04B 7/18513 |
| 2024/0236843 | A1* | 7/2024 | Catovic | H04B 7/18513 |

FOREIGN PATENT DOCUMENTS

| | | |
|---|---|---|
| CN | 110913508 A | 3/2020 |
| CN | 111586114 A | 8/2020 |
| CN | 111698707 A | 9/2020 |
| CN | 111869303 A | 10/2020 |
| CN | 112134802 A | 12/2020 |
| CN | 112333717 A | 2/2021 |
| CN | 113986520 A | 1/2022 |
| CN | 114090222 A | 2/2022 |
| KR | 20190019005 A | 2/2019 |
| WO | 2020150875 A1 | 7/2020 |
| WO | 2022/022584 A | 2/2022 |
| WO | 2022028418 A1 | 2/2022 |
| WO | 2022156752 A1 | 7/2022 |

OTHER PUBLICATIONS

Zhang Jingru, "Research on 5G Mobile Edge Computing Integrated Equipment and Computing Power Resource Allocation Method", Modern Information Technology, vol. 5, No. 22, Nov. 2021, 3 pages.
Huang Guangping et al, "Analysis of Computation Network Architecture and According Scenarios", No. 4, Aug. 2020, 7 pages.
Li, Mingxuan et al, "Research on Edge Resource Scheduling Solutions for Computing Power Network", Frontiers of Data & Computing, vol. 2, No. 4, Aug. 2020, 2 pages.
Extended European Search Report issued in related European Application No. 22758978.5, mailed Jul. 16, 2024, 9 pages.
First Office Action issued in related Chinese Application No. 202110217692.5, mailed Nov. 21, 2023, 9 pages.
LG Electronics et al, "KI#16, New Sol: UE Presence Pattern analytics to support edge computing." 3GPP tsg_sa\wg2_arch, S2-2003843, Jun. 2020, 6 pages.
ITU-T SG17,"LS on Security requirements for vertical services supporting Ultra Reliable and Low Latency Communication (URLLC) in the 5G non-public networks" 3GPP tsg_sa\wg3_security, S3-202856, Nov. 2020, 20 pages.
Second Office Action issued in related Chinese Application No. 202110217692.5, mailed Jul. 12, 2024, 9 pages.

\* cited by examiner

NATIVE COMPUTING POWER SERVICE IMPLEMENTATION METHOD AND APPARATUS, NETWORK DEVICE, AND TERMINAL

CROSS-REFERENCE TO RELATED APPLICATIONS

This application is a continuation of International Application No. PCT/CN2022/077974, filed Feb. 25, 2022, which claims priority to Chinese Patent Application No. 202110217692.5, filed Feb. 26, 2021. The entire contents of each of the above-referenced applications are expressly incorporated herein by reference.

TECHNICAL FIELD

The present application relates to the technical field of mobile communication, and specifically relates to a native computing power service implementation method and apparatus, a network device, and a terminal.

BACKGROUND

In a 5G system, a computing power service is regarded as an application layer service. Optimization performed by a network for the computing power service aims to support edge computing. Edge computing enables an operator to select, for a terminal (User Equipment, UE), a third-party service provider closer to an access point of the UE to provide services.

Due to the need to introduce a third party, the operator cannot effectively monitor the computing power service.

SUMMARY

The purpose of the embodiments of the present application is to provide a native computing power service implementation method and apparatus, a network device, and a terminal.

In a first aspect, a native computing power service implementation method is provided, which is executed by a target network device, and the method includes:
  performing logical interaction for native computing power service with a terminal through a user plane, and providing the terminal with a native computing power service that meets a computing power resource requirement of the terminal.

In a second aspect, a native computing power service implementation apparatus is provided, including:
  an interaction module, configured to perform logical interaction for native computing power service with a terminal through a user plane; and
  a service providing module, configured to provide the terminal with a native computing power service that meets a computing power resource requirement of the terminal.

In a third aspect, a native computing power service implementation method is provided, which is executed by a terminal, and the method includes:
  performing native computing power service signaling interaction with a target network device through a user plane, to obtain a native computing power service that meets a computing power resource requirement.

In a fourth aspect, a native computing power service implementation apparatus is provided, including:
  a transceiver module, configured to perform native computing power service signaling interaction with a target network device through a user plane; and
  a service execution module, configured to obtain a native computing power service that meets a computing power resource requirement.

In a fifth aspect, a network device is provided. The network device includes a processor, a memory, and a program or an instruction that is stored in the memory and that can be run on the processor, where when the program or the instruction is executed by the processor, the steps of the method in the first aspect are implemented.

In a sixth aspect, a terminal is provided. The terminal includes a processor, a memory, and a program or an instruction that is stored in the memory and that can be run on the processor, where when the program or the instruction is executed by the processor, the steps of the method in the third aspect are implemented.

In a seventh aspect, a readable storage medium is provided. The readable storage medium stores a program or an instruction, and when the program or the instruction is executed by a processor, the steps of the method in the first aspect or the steps of the method in the third aspect are implemented.

In an eighth aspect, a chip is provided. The chip includes a processor and a communication interface, where the communication interface is coupled to the processor, and the processor is configured to run a program or an instruction of a network device, to implement the method according to the first aspect or to implement the method according to the third aspect.

In the embodiments of the present application, logical interaction for native computing power service is performed with a terminal through a user plane, and the terminal is provided with a native computing power service that meets a computing power resource requirement of the terminal. Through the embodiments of the present application, the operator can realize and monitor the native computing power service by itself, and simultaneously meet the communication requirement and the computing power requirement of the UE.

DETAILED DESCRIPTION

The following describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first", "second", and the like in the description and the claims of the present application are used to distinguish between similar objects, and do not need to be used to describe a specific order or sequence. It should be understood that, data termed in such a way is interchangeable in proper circumstances, so that the embodiments of the present application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of the present application is not limited to a Long Time Evolution (LTE)/LTE-Advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of the present application may be used interchangeably. The technologies described can be applied to both the systems and the radio technologies mentioned above as well as to other systems and radio technologies. However, a New Radio (NR) system (a communication system) is described in the following description for illustrative purposes, and the NR terminology is used in most of the following description, although these technologies can also be applied to applications other than the NR system application, such as a 5G evolved system and a $6^{th}$ generation (6G) communication system.

Figure 1:
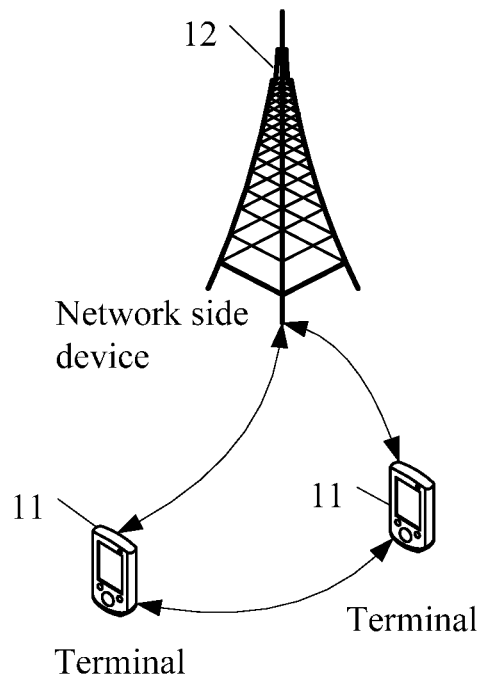
FIG. 1 is a structural diagram of a wireless communication system to which this embodiment of the present application is applicable.

FIG. 1 is a structural diagram of a wireless communications system to which embodiments of the present application can be applied. The wireless communication system includes a terminal 11 and a network device 12. The terminal 11 may also be referred to as a terminal device or UE. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, glasses, and the like. It should be noted that a specific type of the terminal 11 is not limited in this embodiment of the present application. The network device 12 may be a base station or a core network device. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a wireless local area network (WLAN) access point, a WiFi node, a transmitting receiving point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited.

The native computing power service implementation method provided by the embodiments of the present application will be described in detail below through specific embodiments and application scenarios with reference to the accompanying drawings.

Figure 2:
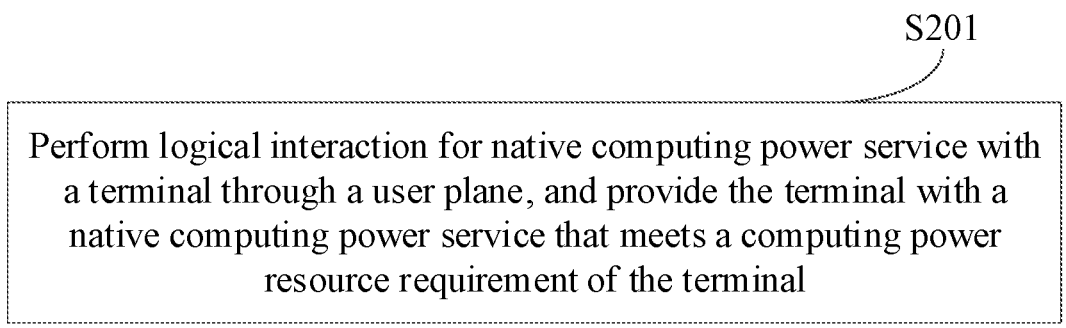
FIG. 2 is a flowchart of a native computing power service implementation method provided by an embodiment of the present application.

FIG. 2 is a schematic flowchart of a native computing power service implementation method provided by an embodiment of the present application. The method can be executed by a target network device. In other words, the method can be executed by software or hardware installed on the target network device. As shown in FIG. 2, the method may include the following steps.

Step S201: Perform logical interaction for native computing power service with a terminal through a user plane, and provide the terminal with a native computing power service that meets a computing power resource requirement of the terminal.

In order to realize the native computing power service, the embodiments of the present application introduce a computing service layer (CS layer) and the target network device for realizing the native computing power service.

It should be understood that in this specification, a computing power service is equivalent to a computing service, and computing is equivalent to computing power.

The target network device is a computing service control function (CSCF). The computing power service control functional is a functional entity introduced in the embodiments of the present application dedicated to realizing the native computing power service, or other functional entities that can realize the native computing power service. For the sake of simplicity, in the following embodiments, the CSCF is used as an example for illustration.

Figure 3:
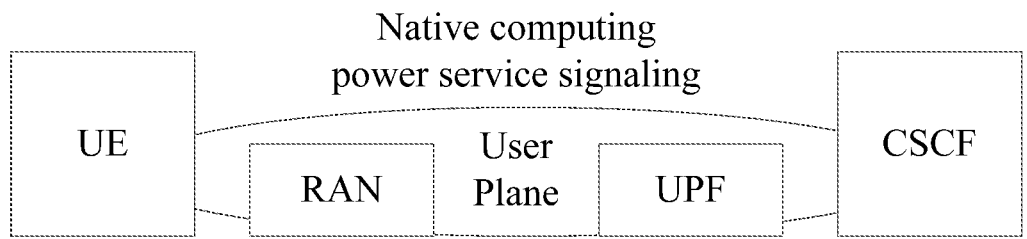
FIG. 3 is a schematic diagram of a signaling interaction method for native computing power service implementation provided by an embodiment of the present application.

As shown in FIG. 3, the computing service layer is a user plane established with the user plane function (UPF) by the terminal through a radio access network (RAN). The user plane is used for native computing power service signaling interaction with the CSCF. In this way, the native computing power service that meets the computing power resource requirement of the terminal is realized.

In the case of providing the terminal with a native computing power service that meets the computing power resource requirement of the terminal, the target network device is configured to implement at least one of the following functions on an Internet Protocol (IP) transmission platform:

performing authentication and authorization for the terminal to access the native computing power service;

negotiating computing power quality of service for the native computing power service; used to meet the computing power resource requirement of the terminal, such as computing power quality of service (QoS);

scheduling of a computing resource;

routing; or charging, where the CSCF is responsible for collecting a charging data record (CDR).

The above logic functions may all be implemented on the target network device, or may be respectively implemented by corresponding logic function entities.

Therefore, in the native computing power service implementation method provided by the embodiments of the present application, the logical interaction for native computing power service is performed with the terminal through the user plane, and the terminal is provided with a native computing power service that meets the computing power resource requirement of the terminal, so that the operator can realize and monitor the native computing power service by itself, and simultaneously meet the communication requirement and the computing power requirement of the UE.

Figure 4:
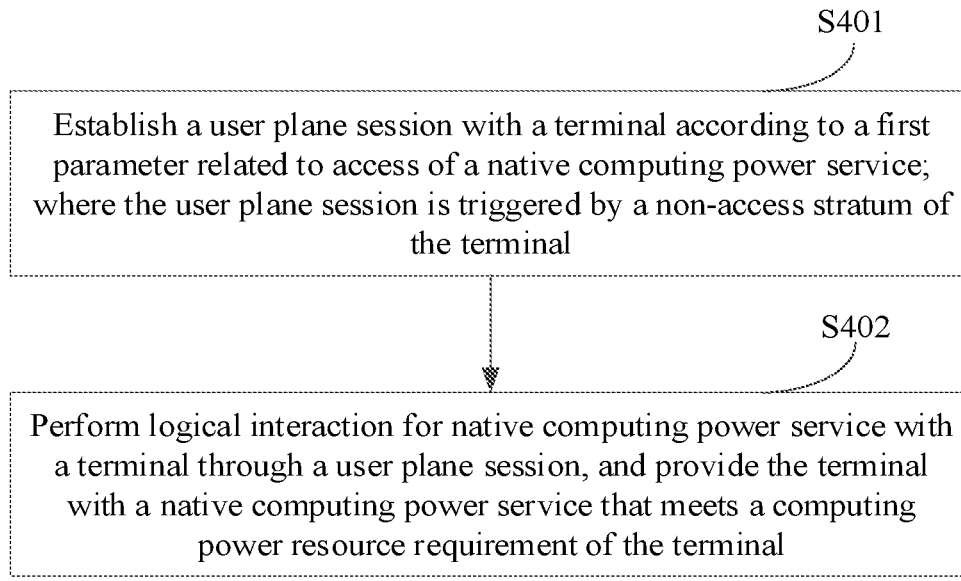
FIG. 4 is another flowchart of a native computing power service implementation method provided by an embodiment of the present application.

FIG. 4 is another schematic flowchart of a native computing power service implementation method provided by an embodiment of the present application. The method can be executed by a target network device. In other words, the method can be executed by software or hardware installed on the target network device. As shown in FIG. 4, the method may include the following steps.

Step S401: Establish a user plane session with a terminal according to a first parameter related to access of a native computing power service; where the user plane session is triggered by a Non Access Stratum (NAS) of the terminal.

The terminal first establishes a user plane session with a target network device CSCF.

It should be understood that the terminal needs to subscribe to a network-based native computing power service in advance.

After the terminal is connected to the network, the terminal can first determine whether the network supports a native computing power service. In some embodiments, after the network receives a registration message of the terminal, the network can reply a registration acceptance message to notify the terminal of indication information indicating whether the network supports the native computing power service, and the non-access stratum of the terminal notifies the upper layer of the terminal of the indication information indicating whether the network supports the native computing power service.

After it is determined that the connected network supports the native computing power service, the first parameter is obtained from the network.

The first parameter includes at least one of the following:

an Access Point Name (APN) network name;

a Data Network Name (DNN);

slice information configured by the network; where in the case that the network configures a slice, slice information and DNN information are obtained at the same time, and the slice is a computing power service slice; or subscribed transmission quality of service.

When the upper layer of the terminal obtains that the network supports the native computing power service, the upper layer of the terminal can determine whether to obtain a certain kind of native computing power service, and send a relevant trigger instruction to the non-access stratum of the UE through an Attention command (ATcommand) or a Qualcomm Message Interface (QMI) command.

The non-access stratum of the terminal triggers a session establishment process according to the relevant trigger instruction, and establishes a user plane session according to the first parameter.

The access request triggered by the user plane session adopts an access category corresponding to access of the native computing power service.

A default quality of service flow of the user plane session adopts a specific service requirement value identifier, and is used to transmit logical interaction for native computing power service information. For example, that 5QI is 5 or another value is used to indicate a QoS parameter value.

Step S402: Perform logical interaction for native computing power service with a terminal through the user plane session, and provide the terminal with a native computing power service that meets a computing power resource requirement of the terminal.

Therefore, in the native computing power service implementation method provided by the embodiments of the present application, the user plane session is established with the terminal according to the first parameter related to access of the native computing power service, and logical interaction for native computing power service is performed with the terminal based on the user plane session, so that the operator can realize and monitor the native computing power service of the terminal, and simultaneously meet the communication requirement and the computing power requirement of the UE.

Figure 5:
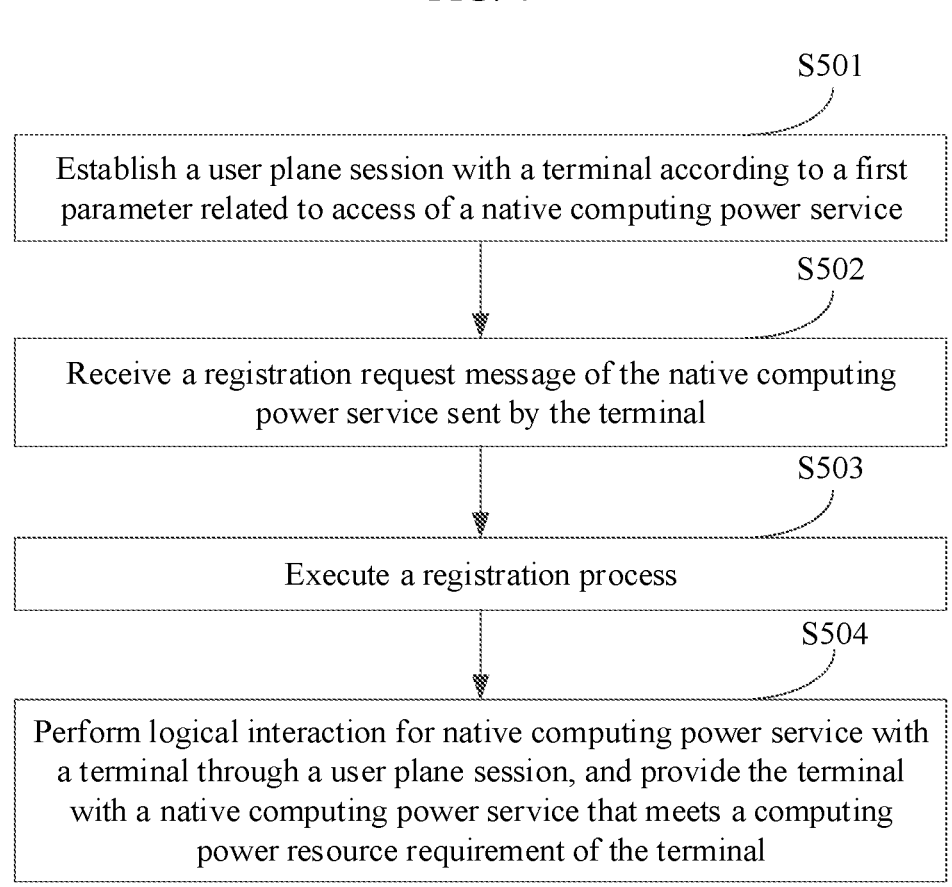
FIG. 5 is another flowchart of a native computing power service implementation method provided by an embodiment of the present application.

FIG. 5 is another schematic flowchart of a native computing power service implementation method provided by an embodiment of the present application. The method can be executed by a target network device. In other words, the method can be executed by software or hardware installed on the target network device. As shown in FIG. 5, the method may include the following steps.

Step S501: Establish a user plane session with a terminal according to a first parameter related to access of a native computing power service.

The step S501 can implement the method embodiment of the step S401 in FIG. 4 and achieve the same technical effect, and will not be repeated herein to avoid repetition.

Step S502: Receive a registration request message of the native computing power service sent by the terminal.

Step S503: Execute a registration process.

Figure 6:
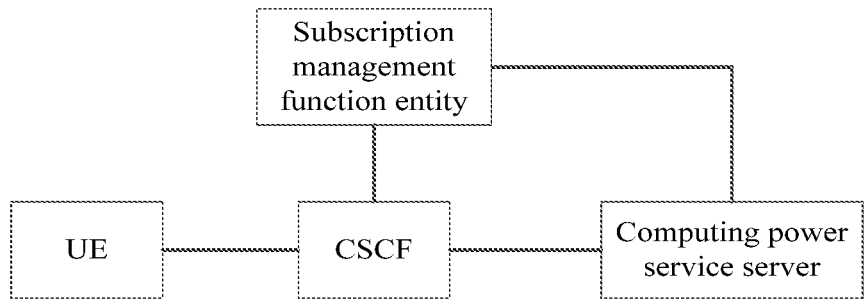
FIG. 6 is a schematic diagram of a registration process of a native computing power service provided by an embodiment of the present application.

In an embodiment, as shown in FIG. 6, the registration process includes:

obtaining, by the CSCF, authentication information of the terminal from a subscription management functional entity, and performing authentication;

if the authentication is successful, obtaining, by the CSCF, user data of the terminal from the subscription management functional entity; and notifying, by the CSCF, a computing power service server to perform third-party registration.

The computing power service server can obtain user data from the subscription management functional entity according to actual needs.

In an implementation manner, after the third-party registration is performed with the computing power service server, the CSCF may receive a message from the terminal for subscribing to a registration event notification.

In an implementation manner, when the terminal is roaming, a user plane session for home routing is established with the terminal according to the first parameter related to access of the native computing power service.

Step S504: Perform logical interaction for native computing power service with a terminal through the user plane session, and provide the terminal with a native computing power service that meets a computing power resource requirement of the terminal.

The step S504 can implement the method embodiment of the step S402 in FIG. 4 and achieve the same technical effect, and will not be repeated herein to avoid repetition.

Therefore, in the native computing power service implementation method provided by the embodiments of the present application, the terminal registers the native computing power service through a preset registration process, so that the terminal can realize the native computing power service on the operator network.

Figure 7:
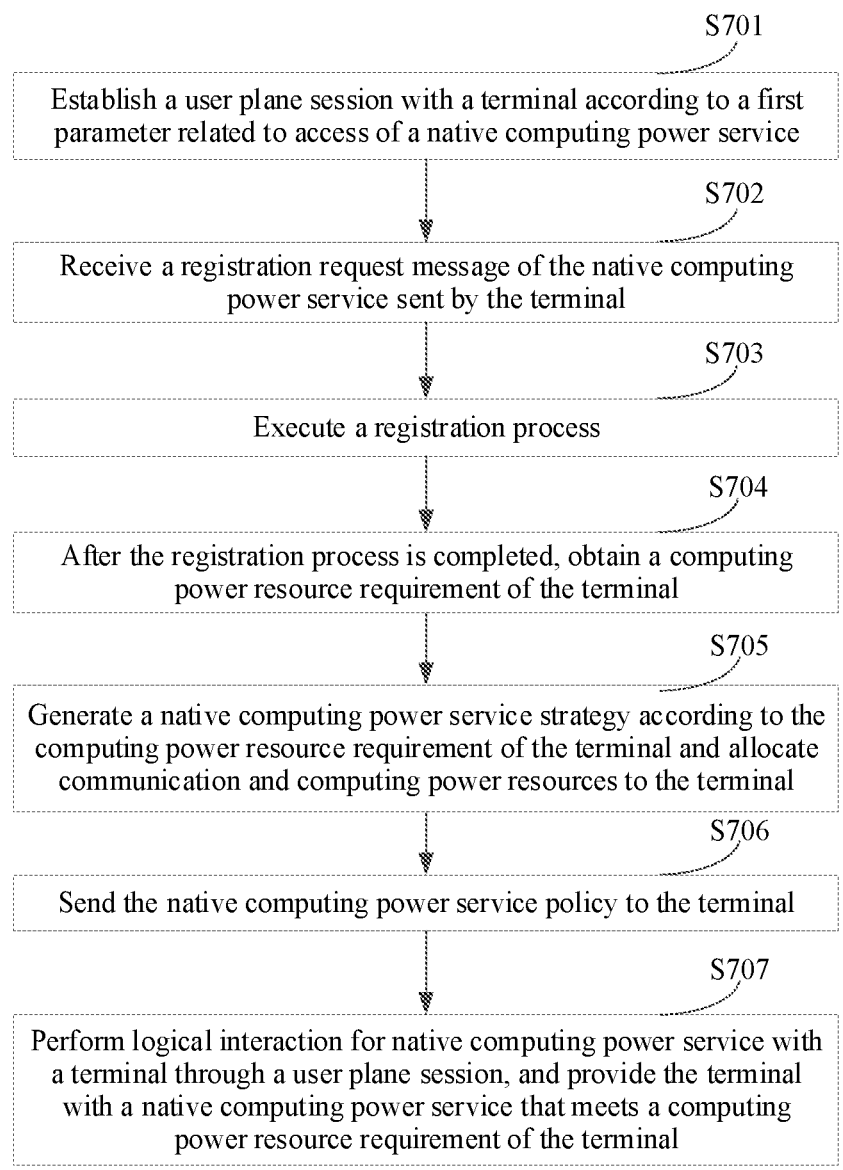
FIG. 7 is another flowchart of a native computing power service implementation method provided by an embodiment of the present application.

FIG. 7 is another schematic flowchart of a native computing power service implementation method provided by an embodiment of the present application. The method can be executed by a target network device. In other words, the method can be executed by software or hardware installed on the target network device. As shown in FIG. 7, the method may include the following steps.

Step S701: Establish a user plane session with a terminal according to a first parameter related to access of a native computing power service.

Step S702: Receive a registration request message of the native computing power service sent by the terminal.

Step S703: Execute a registration process.

The step S701 to 703 can implement the method embodiment of the step S501 to 503 in FIG. 5 and achieve the same technical effect, and will not be repeated herein to avoid repetition.

Step S704: After the registration process is completed, obtain a computing power resource requirement of the terminal.

After the terminal registers with the CSCF, the terminal negotiates a required native computing power service strategy with the CSCF according to the computing power resource requirement of the terminal.

Step S705: Generate a native computing power service strategy according to the computing power resource requirement of the terminal and allocate communication and computing power resources to the terminal.

In an embodiment, the CSCF can generate a native computing power service strategy directly or through a Policy Control Function (PCF) according to the computing power resource requirement of the terminal and allocate communication and computing power resources to the terminal.

In order to generate the native computing power service strategy, the CSCF or the PCF needs to collect relevant information of each layer in the network for intelligent summary decision-making.

In an implementation manner, the first information is obtained through an execution entity of the target network function.

It should be understood that the execution entity of the target network function is a Network Data Analytics Function (NWDAF) entity, or other functional entities for performing information or network state collection and analysis, such as an execution entity of an Artificial Intelligence (AI) plane, that is, the first information is collected from each layer in the network through the artificial intelligence plane. For the sake of simplicity, in the following embodiments, the execution entity of the artificial intelligence plane is taken as an example for illustration.

The native computing power service strategy is generated according to the first information and the computing power resource requirement of the terminal.

The first information includes second information obtained from the transport layer and third information obtained from the native computing layer.

The second information includes at least one of the following: transmission status information on the network side, or location information and a movement track of the terminal.

The third information includes at least one of the following: computing power resource distribution information of the computing power service server in the network.

The artificial intelligence layer transmits the first information obtained from the above two layers to the native computing layer, and the CSCF selects, on the movement track of the terminal according to the computing power QoS requirement of the terminal, a computing power service server and a matched gateway that meet the computing power resource requirement of the terminal and that have the lowest congestion probability on the transmission path, to form the native computing power service strategy.

The native computing power service strategy includes: an address or an identifier of the computing power service server, a gateway address or identifier, transmission quality of service, and other information.

According to the formed computing power service strategy, the CSCF updates the native computing power service strategy on the session management entity directly or through the PCF, so that the session management entity triggers the session management process, switches the session to an appropriate user plane function, and adjusts the transmission quality of service of the terminal, or the like.

Step S706: Send the native computing power service strategy to the terminal.

Step S707: Perform logical interaction for native computing power service with a terminal through the user plane session, and provide the terminal with a native computing power service that meets a computing power resource requirement of the terminal.

The step S707 can implement the method embodiment of the step S504 in FIG. 5 and achieve the same technical effect, and will not be repeated herein to avoid repetition.

Further, in the case that the terminal performs the native computing power service, it is necessary to monitor the current computing power computing service to determine whether the current user plane session meets the computing power resource requirement of the terminal. This includes:

obtaining the first information through an execution entity of the target network function;

determining, by the execution entity of the target network function according to the first information, whether the user plane session satisfies the computing power resource requirement of the terminal; and in the case that the user plane session does not meet the computing power resource requirement of the terminal, updating the native computing power service strategy, and adjusting to communication and computing power resources allocated to the terminal, including: updating the gateway, updating service server, or updating transmission QoS.

The CSCF updates the native computing power service strategy directly or through the PCF, and adjusts to the communication and computing power resources allocated to the terminal.

The CSCF updates the native computing power service strategy on the session management entity directly or through the PCF, so that the session management entity triggers the session management process, switches the session to an appropriate user plane function, and adjusts the transmission quality of service of the terminal the like.

The CSCF sends a relevant message to the terminal, so that the terminal updates the native computing power service strategy.

Further, in the case that the terminal performs the native computing power service, the method further includes:

interacting with the computing power service server to collect charging information related to the native computing power service; and sending the charging information related to the native computing power service of the terminal to the charging entity, so that the charging entity obtains a charging data record according to the charging information related to the native computing power service of the terminal and charging information generated in transmission.

The charging information includes at least one of the following:

a computing power service type;
a computing amount;
a computing duration;
an amount of computing power resources used; or
a duration of computing power resources used.

Therefore, in the native computing power service implementation method provided by the embodiments of the present application, the terminal negotiates the required computing power resources with the CSCF, and is allocated with communication and computing power resources, thereby providing the terminal with the native computing power service that meets the computing power resource requirement of the terminal.

It should be noted that, for the native computing power service implementation method provided in the embodiments of the present application, the execution subject may be a native computing power service implementation apparatus, or a control module in the native computing power service implementation apparatus configured to perform the native computing power service implementation method. In the embodiments of the present application, the native computing power service implementation apparatus performing the native computing power service implementation method is taken as an example to illustrate the native computing power service implementation apparatus provided in the embodiments of the present application.

Figure 8:
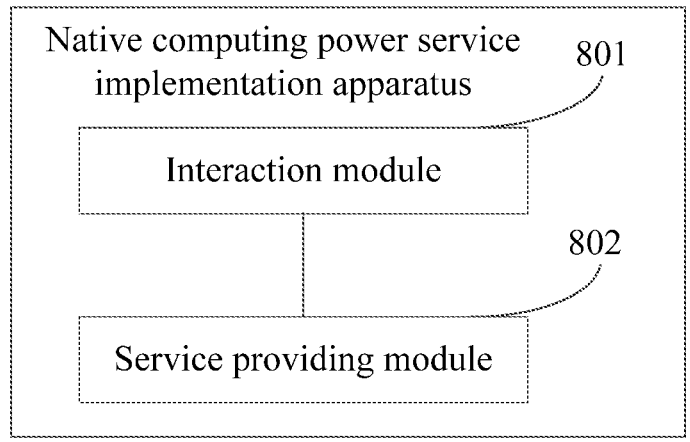
FIG. 8 is a schematic structural diagram of a native computing power service implementation apparatus provided by an embodiment of the present application.

As shown in FIG. 8, the native computing power service implementation apparatus includes: an interaction module 801 and a service providing module 802.

The interaction module 801 is configured to perform logical interaction for native computing power service with the terminal through a user plane; and the service providing module 802 is configured to provide a terminal with a native computing power service that meets a computing power resource requirement of the terminal.

Further, in the case of providing the terminal with a native computing power service that meets the computing power resource requirement of the terminal, the target network device is configured to implement at least one of the following functions on an Internet Protocol transmission platform:

performing authentication and authorization for the terminal to access the native computing power service;
negotiating computing power quality of service for the native computing power service;
scheduling of a computing resource;
routing; or
charging.

Further, the target network device is a computing power service control function CSCF.

Therefore, in the native computing power service implementation method provided by the embodiments of the present application, the logical interaction for native computing power service is performed with the terminal through the user plane, and the terminal is provided with a native computing power service that meets the computing power resource requirement of the terminal, so that the operator can realize and monitor the native computing power service by itself.

Based on the above embodiments, further, the interaction module is configured to:

establish a user plane session with a terminal according to a first parameter related to access of a native computing power service; where the user plane session is triggered by a non-access stratum of the terminal; and perform logical interaction for native computing power service with a terminal through the user plane session, and provide the terminal with a native computing power service that meets a computing power resource requirement of the terminal.

Further, the first parameter is obtained by the terminal from a network side that supports the native computing power service;

The first parameter includes at least one of the following:
an access point network name;
data network name information;
slice information configured by a network; or
subscribed transmission quality of service.

Further, the access request triggered by the user plane session adopts an access category corresponding to access of the native computing power service.

Further, a default quality of service flow of the user plane session adopts a specific service requirement value identifier, and is used to transmit logical interaction for native computing power service information.

Therefore, in the native computing power service implementation method provided by the embodiments of the present application, the user plane session is established with the terminal according to the first parameter related to access of the native computing power service, and logical interaction for native computing power service is performed with the terminal based on the user plane session, so that the operator can realize and monitor the native computing power service of the terminal, and simultaneously meet the communication requirement and the computing power requirement of the UE.

Based on the above embodiments, further, the interaction module is further configured to:
receive a registration request message of the native computing power service sent by the terminal; and
execute a registration process.

Further, the execution of the registration process includes:
obtaining authentication information of the terminal from a subscription management functional entity, and performing authentication;
if the authentication is successful, obtaining user data of the terminal from the subscription management functional entity; and
performing third-party registration with a computing power service server.

Further, the interaction module is further configured to:
receive a message from the terminal for subscribing to a registration event notification.

Further, when the terminal is roaming, the interaction module is configured to:
establish a user plane session for home routing with a terminal according to a first parameter related to access of a native computing power service.

Therefore, in the native computing power service implementation method provided by the embodiments of the present application, the terminal registers the native computing power service through a preset registration process, so that the terminal can realize the native computing power service on the operator network.

Based on the above embodiments, further, the interaction module is further configured to:
after the registration process is completed, obtain a computing power resource requirement of the terminal;
generate a native computing power service strategy according to the computing power resource requirement of the terminal and allocate communication and computing power resources to the terminal; and
send the native computing power service strategy to the terminal.

Further, the interaction module is configured to:
generate a native computing power service strategy through a policy control function according to the computing power resource requirement of the terminal and allocate communication and computing power resources to the terminal.

Further, the interaction module is configured to:
obtain the first information through an execution entity of the target network function; and
generate the native computing power service strategy according to the first information and the computing power resource requirement of the terminal.

The first information includes second information obtained from the transport layer and third information obtained from the native computing layer.

The second information includes at least one of the following: transmission status information on the network side, or location information and a movement track of the terminal.

The third information includes: computing power resource distribution information of the computing power service server in the network.

Further, the interaction module is configured to:
select, on the movement track of the terminal, a computing power service server and a matched gateway that meet the computing power resource requirement of the terminal and that have the lowest congestion probability on the transmission path.

Further, the interaction module is configured to:
update the native computing power service strategy on the session management entity, so that the session management entity triggers the session management process, switches the session to an appropriate user plane function, and adjusts the transmission quality of service of the terminal.

Further, in the case that the terminal performs the native computing power service, the interaction module is further configured to:
obtain the first information through an execution entity of the target network function; and
determine, according to the first information, whether the user plane session satisfies the computing power resource requirement of the terminal; and
in the case that the user plane session does not meet the computing power resource requirement of the terminal, update the native computing power service strategy, and adjusting to communication and computing power resources allocated to the terminal.

Further, the interaction module is configured to:
update the native computing power service strategy through the policy control function, and adjust to the communication and computing power resources allocated to the terminal.

Further, the execution entity of the target network function is a network data analysis function entity, or other function entities for performing information or network status collection and analysis.

Further, the native computing power service strategy includes: an address or an identifier of the computing power service server, a gateway address or identifier, or transmission quality of service.

Further, in the case that the terminal performs the native computing power service, the interaction module is further configured to:
interact with the computing power service server to collect charging information related to the native computing power service; and
send the charging information related to the native computing power service of the terminal to the charging entity, so that the charging entity obtains a charging data record according to the charging information related to the native computing power service of the terminal and charging information generated in transmission.

Further, the charging information includes at least one of the following:
a computing power service type;
a computing amount;
a computing duration;
an amount of computing power resources used; or
a duration of computing power resources used.

Therefore, in the native computing power service implementation method provided by the embodiments of the present application, the terminal negotiates the required computing power resources with the CSCF, and is allocated with communication and computing power resources, thereby providing the terminal with the native computing power service that meets the computing power resource requirement of the terminal.

The native computing power service implementation apparatus in the embodiments of the present application may be an apparatus, or a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a personal computer (PC), a television (TV), a teller machine, or a self-service machine. This is not specifically limited in this embodiment of the present application.

The native computing power service implementation apparatus in the embodiments of the present application may be an apparatus with an operating system. The operating system may be an Android operating system, an iOS operating system, or another possible operating system. This is not specifically limited in the embodiments of the present application.

The native computing power service implementation apparatus according to an embodiment of the present disclosure can implement the processes in the method embodiments in FIG. 1 to FIG. 7, and achieve the same technical effect. To avoid duplication, details are not described herein again.

Figure 9:
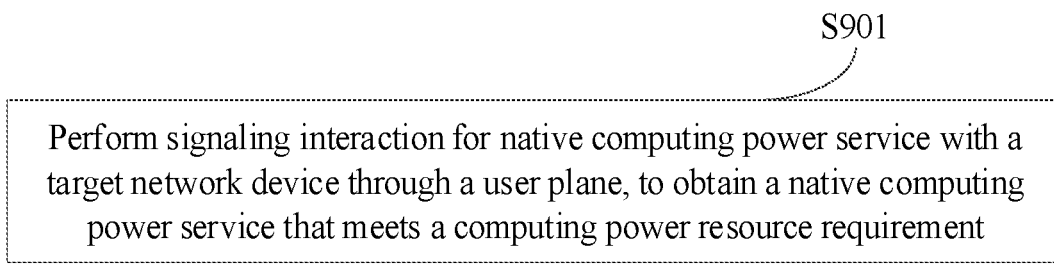
FIG. 9 is another flowchart of a native computing power service implementation method provided by an embodiment of the present application.

FIG. 9 is another schematic flowchart of a native computing power service implementation method provided by an embodiment of the present application. The method can be executed by a terminal. In other words, the method can be executed by software or hardware installed on the terminal. As shown in FIG. 9, the method may include the following steps.

Step S901: Perform native computing power service signaling interaction with a target network device through a user plane, to obtain a native computing power service that meets a computing power resource requirement.

Further, the target network device is a computing power service control function.

The step S901 can implement the method embodiment of the step S201 in FIG. 2 and achieve the same technical effect, and will not be repeated herein to avoid repetition.

Therefore, in the native computing power service implementation method provided by the embodiments of the present application, the logical interaction for native computing power service is performed with the terminal through the user plane, and the terminal is provided with a native computing power service that meets the computing power resource requirement of the terminal, so that the operator can realize and monitor the native computing power service by itself, and simultaneously meet the communication requirement and the computing power requirement of the UE.

Figure 10:
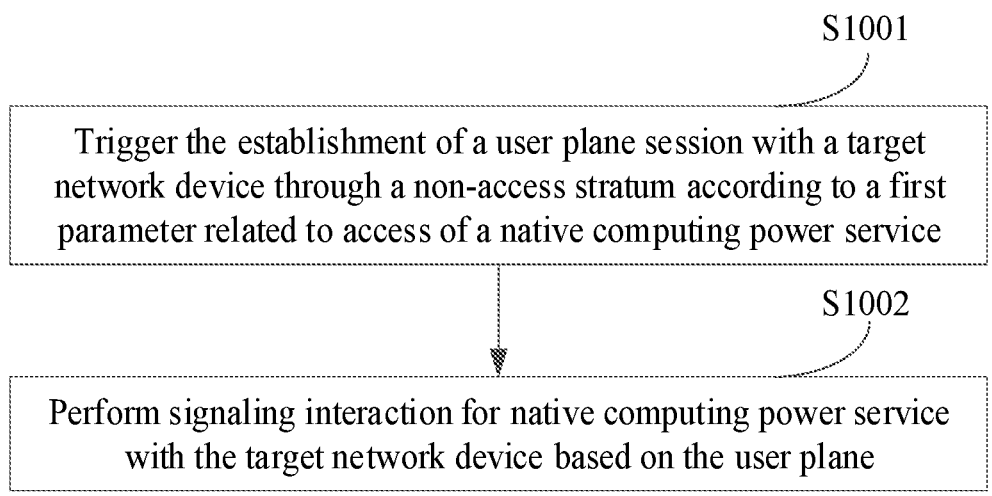
FIG. 10 is another flowchart of a native computing power service implementation method provided by an embodiment of the present application.

FIG. 10 is another schematic flowchart of a native computing power service implementation method provided by an embodiment of the present application. The method can be executed by a terminal. In other words, the method can be executed by software or hardware installed on the terminal. As shown in FIG. 10, the method may include the following steps.

Step S1001: Trigger the establishment of a user plane session with a target network device through a non-access stratum according to a first parameter related to access of a native computing power service.

Step S1002: Perform native computing power service signaling interaction with the target network device based on the user plane session.

Further, before the triggering establishment of the user plane session with the target network device through the non-access stratum, the method further includes:
in a case of determining that the accessed network side supports the native computing power service, sending, by the upper layer, a trigger indication to the non-access stratum.

Further, before the upper layer sends the trigger indication to the non-access stratum, the method further includes:
obtaining information indicating whether the network side supports the native computing power service, and sending the information to the upper layer through the non-access stratum.

Further, before establishing the user plane session with the target network device, the method further includes:
obtaining the first parameter from the network side;
The first parameter includes at least one of the following:
an access point network name;
data network name information;
slice information configured by a network; or
subscribed transmission quality of service.

Further, the access request triggered by the user plane session adopts an access category corresponding to access of the native computing power service.

Further, a default quality of service flow of the user plane session adopts a specific service requirement value identifier, and is used to transmit logical interaction for native computing power service information.

The step S1001 to S1002 can implement the method embodiment of the step S401 to S402 in FIG. 4 and achieve the same technical effect, and will not be repeated herein to avoid repetition.

Therefore, in the native computing power service implementation method provided by the embodiments of the present application, the user plane session is established with the terminal according to the first parameter related to access of the native computing power service, and logical interaction for native computing power service is performed with the terminal based on the user plane session, so that the operator can realize and monitor the native computing power service of the terminal, and simultaneously meet the communication requirement and the computing power requirement of the UE.

Figure 11:
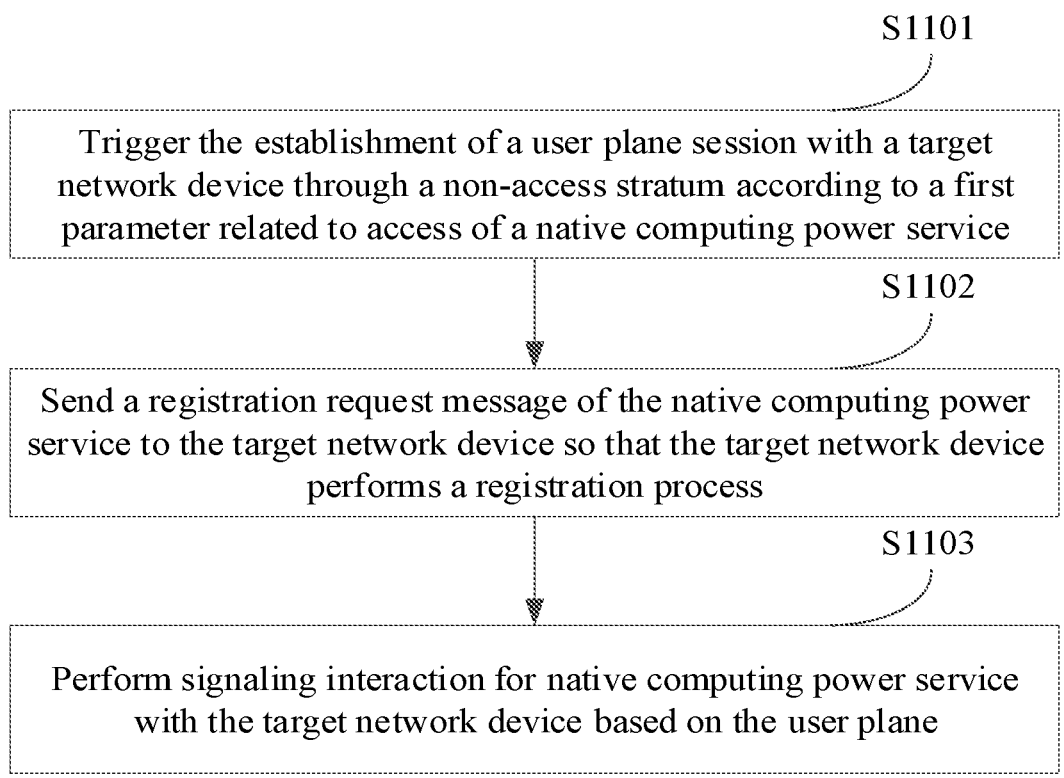
FIG. 11 is another flowchart of a native computing power service implementation method provided by an embodiment of the present application.

FIG. 11 is another schematic flowchart of a native computing power service implementation method provided by an embodiment of the present application. The method can be executed by a terminal. In other words, the method can be executed by software or hardware installed on the terminal. As shown in FIG. 11, the method may include the following steps.

Step S1101: Trigger the establishment of a user plane session with a target network device through a non-access stratum according to a first parameter related to access of a native computing power service.

Step S1102: Send a registration request message of the native computing power service to the target network device, so that the target network device performs a registration process.

Further, the method further includes:
sending a message to the target network device for subscribing to a registration event notification.

Further, when the terminal is roaming, the establishment of a user plane session for home routing with a target network device is triggered through a non-access stratum according to a first parameter related to access of a native computing power service.

Step S1103: Perform native computing power service signaling interaction with the target network device based on the user plane session.

The step S1101 to S1103 can implement the method embodiment of the step S501 to S504 in FIG. 5 and achieve the same technical effect, and will not be repeated herein to avoid repetition.

Therefore, in the native computing power service implementation method provided by the embodiments of the present application, the terminal registers the native computing power service through a preset registration process, so that the terminal can realize the native computing power service on the operator network.

Figure 12:
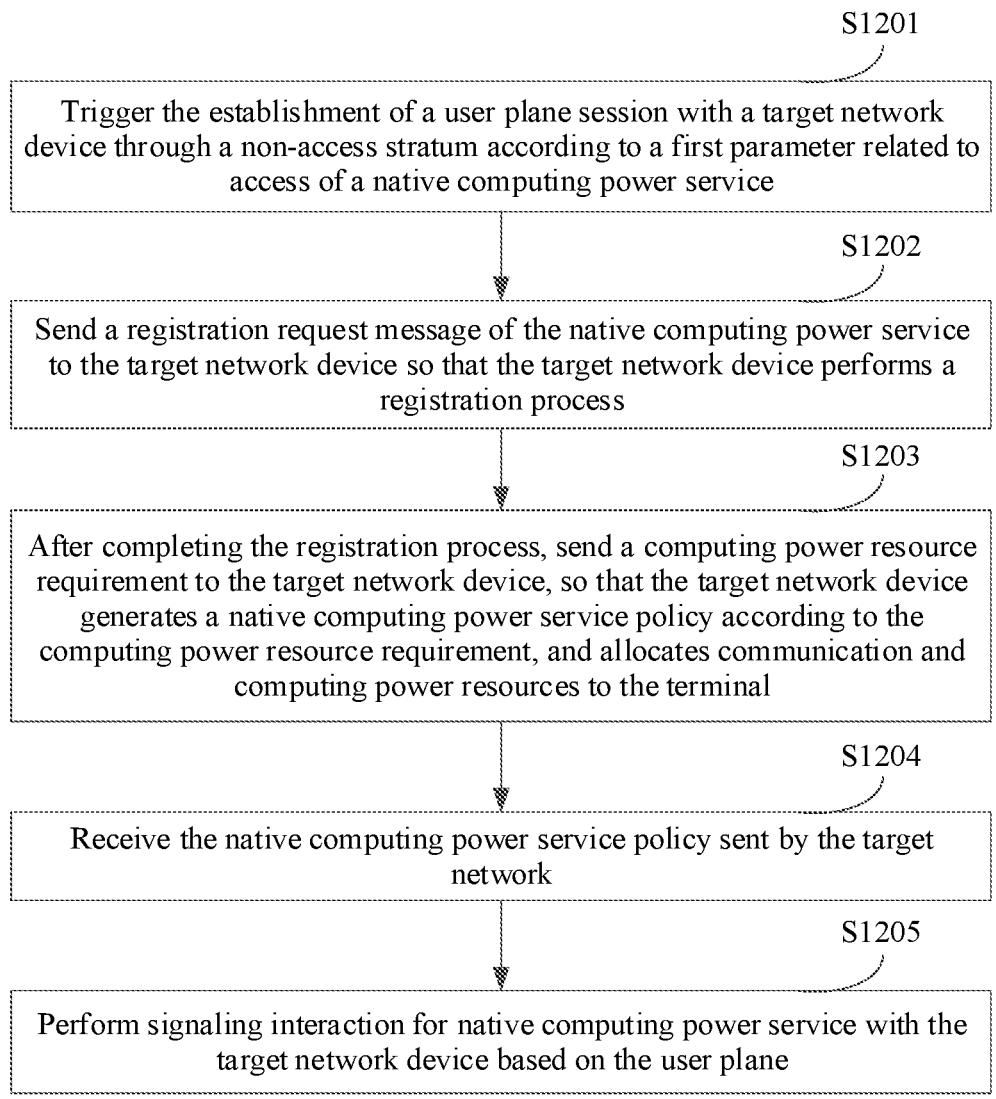
FIG. 12 is another flowchart of a native computing power service implementation method provided by an embodiment of the present application.

FIG. 12 is another schematic flowchart of a native computing power service implementation method provided by an embodiment of the present application. The method can be executed by a terminal. In other words, the method can be executed by software or hardware installed on the terminal. As shown in FIG. 12, the method may include the following steps.

Step S1201: Trigger the establishment of a user plane session with a target network device through a non-access stratum according to a first parameter related to access of a native computing power service.

Step S1202: Send a registration request message of the native computing power service to the target network device, so that the target network device performs a registration process.

Step S1203: After completing the registration process, send a computing power resource requirement to the target network device, so that the target network device generates a native computing power service strategy according to the computing power resource requirement, and allocates communication and computing power resources to the terminal.

Further, generating, by the target network device, a native computing power service strategy according to the computing power resource requirement, and allocating communication and computing power resources to the terminal includes: generating, by the target network device, a native computing power service strategy through a policy control function according to the computing power resource requirement and allocating communication and computing power resources to the terminal.

Further, the allocating communication and computing power resources to the terminal includes:
selecting, on the movement track of the terminal, a computing power service server and a matched gateway that meet the computing power resource requirement of the terminal and that have the lowest congestion probability on the transmission path.

Further, the allocating communication and computing power resources to the terminal includes:
updating, by the target network device, the native computing power service strategy on the session management entity, so that the session management entity triggers the session management process, switches the session to an appropriate user plane function, and adjusts the transmission quality of service of the terminal.

Further, the native computing power service strategy includes: an address or an identifier of the computing power service server, a gateway address or identifier, or transmission quality of service.

Step S1204: Receive the native computing power service strategy sent by the target network device.

Step S1205: Perform native computing power service signaling interaction with the target network device based on the user plane session.

The step S1201 to S1205 can implement the method embodiment of the step S701 to S707 in FIG. 7 and achieve the same technical effect, and will not be repeated herein to avoid repetition.

Therefore, in the native computing power service implementation method provided by the embodiments of the present application, the terminal negotiates the required computing power resources with the CSCF, and is allocated with communication and computing power resources, thereby providing the terminal with the native computing power service that meets the computing power resource requirement of the terminal.

It should be noted that, for the native computing power service implementation method provided in the embodiments of the present application, the execution subject may be a native computing power service implementation apparatus, or a control module in the native computing power service implementation apparatus configured to perform the native computing power service implementation method. In the embodiments of the present application, the native computing power service implementation apparatus performing the native computing power service implementation method is taken as an example to illustrate the native computing power service implementation apparatus provided in the embodiments of the present application.

Figure 13:
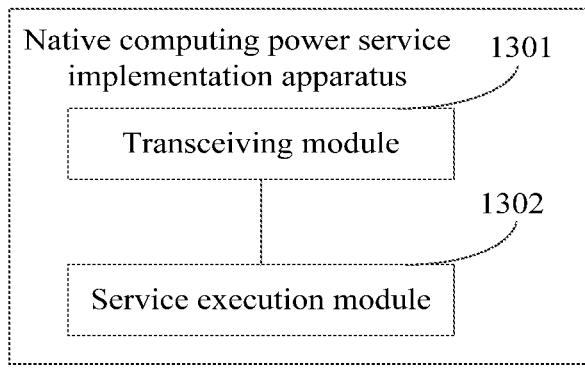
FIG. 13 is another schematic structural diagram of a native computing power service implementation apparatus provided by an embodiment of the present application.

FIG. 13 is another schematic structural diagram of a native computing power service implementation apparatus provided by an embodiment of the present application. As shown in FIG. 13, the apparatus includes: a transceiver module 1301 and a service execution module 1302.

The transceiver module 1301 is configured to perform native computing power service signaling interaction with a target network device through a user plane, and the service execution module 1302 is configured to obtain a native computing power service that meets a computing power resource requirement.

Further, the target network device is a computing power service control function CSCF.

Therefore, in the native computing power service implementation method provided by the embodiments of the present application, the logical interaction for native computing power service is performed with the terminal through the user plane, and the terminal is provided with a native computing power service that meets the computing power resource requirement of the terminal, so that the operator can realize and monitor the native computing power service by itself, and simultaneously meet the communication requirement and the computing power requirement of the UE.

Based on the above embodiments, further, the transceiver module is configured to:
trigger the establishment of a user plane session with a target network device through a non-access stratum according to a first parameter related to access of a native computing power service; and
perform native computing power service signaling interaction with the target network device based on the user plane session.

Further, before the triggering establishment of the user plane session with the target network device through the non-access stratum, the transceiver module is further configured to:
in a case of determining that the accessed network side supports the native computing power service, send, by the upper layer, a trigger indication to the non-access stratum.

Further, before the upper layer sends the trigger indication to the non-access stratum, the transceiver module is further configured to:
obtain information indicating whether the network side supports the native computing power service, and send the information to the upper layer through the non-access stratum.

Further, before establishing a user plane session with the target network device, the transceiver module is further configured to:
obtain the first parameter from the network side.
The first parameter includes at least one of the following:
an access point network name;
data network name information;
slice information configured by a network; or
subscribed transmission quality of service.

Further, the access request triggered by the user plane session adopts an access category corresponding to access of the native computing power service.

Further, a default quality of service flow of the user plane session adopts a specific service requirement value identifier, and is used to transmit logical interaction for native computing power service information.

Therefore, in the native computing power service implementation method provided by the embodiments of the present application, the user plane session is established with the terminal according to the first parameter related to access of the native computing power service, and logical interaction for native computing power service is performed with the terminal based on the user plane session, so that the operator can realize and monitor the native computing power service of the terminal, and simultaneously meet the communication requirement and the computing power requirement of the UE.

Based on the above embodiment, further, after establishing a user plane session with the target network device, the transceiver module is further configured to:
send a registration request message of the native computing power service to the target network device, so that the target network device performs a registration process.

Further, the transceiver module is further configured to:
send a message to the target network device for subscribing to a registration event notification.

Further, in the case of roaming, the transceiver module is configured to:
trigger the establishment of a user plane session for home routing with a target network device through a non-access stratum according to a first parameter related to access of a native computing power service.

Therefore, in the native computing power service implementation method provided by the embodiments of the present application, the terminal registers the native computing power service through a preset registration process, so that the terminal can realize the native computing power service on the operator network.

Based on the above embodiments, further, the transceiver module is further configured to:
after completing the registration process, send a computing power resource requirement to the target network device, so that the target network device generates a native computing power service strategy according to the computing power resource requirement, and allocates communication and computing power resources to the terminal; and
receive the native computing power service strategy sent by the target network device.

Further, the generating, by the target network device, a native computing power service strategy according to the computing power resource requirement includes:
generating, by the target network device, a native computing power service strategy through a policy control function according to the computing power resource requirement and allocating communication and computing power resources to the terminal.

Further, the allocating communication and computing power resources to the terminal includes:
selecting, by the target network device on the movement track of the native computing power service implementation apparatus, a computing power service server and a matched gateway that meet the computing power resource requirement of the native computing power service implementation apparatus and that have the lowest congestion probability on the transmission path.

Further, the allocating, by the target network device, communication and computing power resources to the terminal includes:
updating, by the target network device, the native computing power service strategy on the session management entity, so that the session management entity triggers the session management process, switches the session to an appropriate user plane function, and adjusts the transmission quality of service of the terminal.

Further, the native computing power service strategy includes: an address or an identifier of the computing power service server, a gateway address or identifier, or transmission quality of service.

Therefore, in the native computing power service implementation method provided by the embodiments of the present application, the terminal negotiates the required computing power resources with the CSCF, and is allocated with communication and computing power resources, thereby providing the terminal with the native computing power service that meets the computing power resource requirement of the terminal.

The native computing power service implementation apparatus in the embodiments of the present application may be an apparatus, or a component, an integrated circuit, or a chip in a terminal. The apparatus may be a mobile terminal, or a non-mobile terminal. Exemplarily, mobile terminals may include but are not limited to the types of terminals 11 listed above, and non-mobile terminals may be servers, network-attached storages, personal computers, televisions, teller machines or self-service machines, etc., which are not specifically limited in this embodiment of the present application.

The native computing power service implementation apparatus in the embodiments of the present application may be an apparatus with an operating system. The operating system may be an Android operating system, an iOS operating system, or another possible operating system. This is not specifically limited in the embodiments of the present application.

The native computing power service implementation apparatus according to an embodiment of the present disclosure can implement the processes in the method embodiments in FIG. 9 to FIG. 12, and achieve the same technical effect. To avoid duplication, details are not described herein again.

Figure 14:
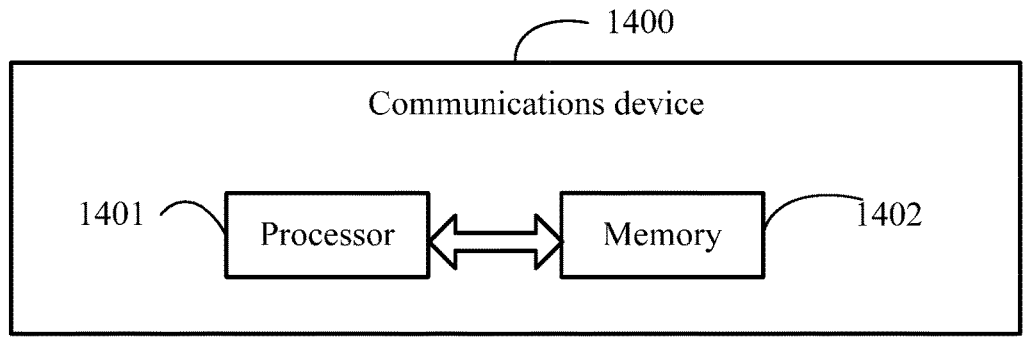
FIG. 14 is a schematic structural diagram of a terminal provided by an embodiment of the present application.

As shown in FIG. 14, an embodiment of the present application further provides a communication device 1400, including a processor 1401, a memory 1402, and a program or an instruction stored in the memory 1402 and executable on the processor 1401. For example, when the communication device 1400 is a terminal, when the program or instruction is executed by the processor 1401, each process of the embodiment of the foregoing native computing power service implementation method is performed, and the same technical effect can be achieved. When the communication device 1400 is a network device, when the programs or instructions are executed by the processor 1401, each process of the above embodiment of the native computing power service implementation method is performed, and the same technical effect can be achieved. To avoid repetition, details are not repeated herein.

Figure 15:
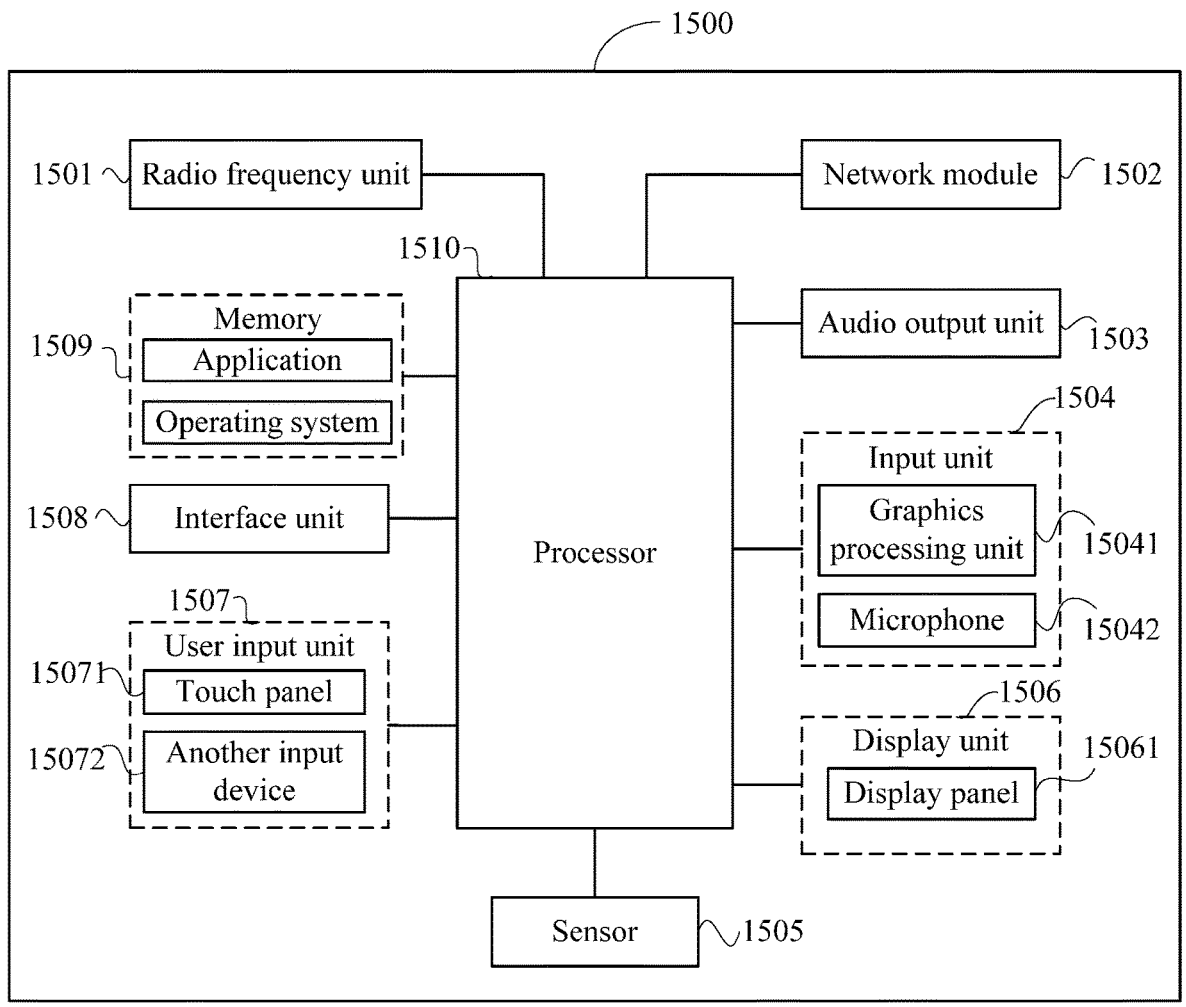
FIG. 15 is a schematic diagram of a hardware structure of a terminal provided by an embodiment of the present application.

FIG. 15 is a schematic diagram of a hardware structure of a terminal according to an embodiment of the present application.

The terminal 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, and a processor 1510.

A person skilled in the art can understand that the terminal 1500 may further include a power supply (such as a battery) that supplies power to each component. The power supply may be logically connected to the processor 1510 by using a power supply management system, to implement functions such as charging and discharging management, and power consumption management by using the power supply management system. The terminal structure shown in FIG. 15 constitutes no limitation on the terminal, and the terminal may include more or fewer components than those shown in the figure, or combine some components, or have different component arrangements. Details are not described herein.

It should be understood that, in this embodiment of the present application, the input unit 1504 may include a graphics processing unit (GPU) 15041 and a microphone 15042, and the graphics processing unit 15041 processes image data of a still picture or a video obtained by an image capture apparatus (for example, a camera) in a video capture mode or an image capture mode. The display unit 1506 may include a display panel 15061, and the display panel 15061 may be configured in a form of a liquid crystal display, an organic light-emitting diode, or the like. The user input unit 1507 includes a touch panel 15071 and another input device 15072. The touch panel 15071 is also referred to as a touchscreen. The touch panel 15071 may include two parts: a touch detection apparatus and a touch controller. The another input device 15072 may include but is not limited to a physical keyboard, a functional button (such as a volume control button or a power on/off button), a trackball, a mouse, and a joystick. Details are not described herein.

In this embodiment of the present application, after receiving downlink data from a network device, the radio frequency unit 1501 sends the downlink data to the processor 1510 for processing, and sends uplink data to the network device. Usually, the radio frequency unit 1501 includes but is not limited to an antenna, at least one amplifier, a transceiver, a coupler, a low noise amplifier, a duplexer, and the like.

The memory 1509 may be configured to store a software program or an instruction and various data. The memory 1509 may mainly include a program or instruction storage area and a data storage area. The program or instruction storage area may store an operating system, and an application or an instruction required by at least one function (for example, a sound playing function or an image playing function). In addition, the memory 1509 may include a high speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 1510 may include one or more processing units. An application processor and a modem processor may be integrated into the processor 1510. The application processor mainly processes an operating system, a user interface, an application, an instruction, or the like. The modem processor mainly processes wireless communications, for example, a baseband processor. It can be understood that, the modem processor may not be integrated into the processor 1510.

The radio frequency unit 1501 is configured to perform native computing power service signaling interaction with the target network device based on the user plane session.

The processor 1510 is configured to obtain a native computing power service that meets a computing power resource requirement.

Further, the target network device is a computing power service control function CSCF.

The operator can realize and monitor the native computing power service by itself, and simultaneously meet the communication requirement and the computing power requirement of the UE.

Further, the radio frequency unit 1501 is configured to trigger the establishment of a user plane session with a target network device through a non-access stratum according to a first parameter related to access of a native computing power service; and perform native computing power service signaling interaction with the target network device based on the user plane session.

Before the triggering establishment of the user plane session with the target network device through the non-access stratum, the method further includes:

in a case of determining that the accessed network side supports the native computing power service, sending, by the upper layer, a trigger indication to the non-access stratum.

Further, before the upper layer sends a trigger indication to the non-access stratum, the radio frequency unit 1501 is further configured to obtain information indicating whether the network side supports the native computing power service, and send the information to the upper layer through the non-access stratum.

Further, before establishing a user plane session with the target network device, the radio frequency unit 1501 is further configured to obtain the first parameter from the network side.

The first parameter includes at least one of the following:
an access point network name;
data network name information;
slice information configured by a network; or
subscribed transmission quality of service.

Further, the access request triggered by the user plane session adopts an access category corresponding to access of the native computing power service.

Further, a default quality of service flow of the user plane session adopts a specific service requirement value identifier, and is used to transmit logical interaction for native computing power service information.

The operator can realize and monitor the native computing power service of the terminal, and simultaneously meet the communication requirement and the computing power requirement of the UE.

Further, after the user plane session with the target network device is established, the radio frequency unit 1501 is further configured to send a registration request message of the native computing power service to the target network device, so that the target network device performs a registration process.

Further, the radio frequency unit 1501 is further configured to send a message to the target network device for subscribing to a registration event notification.

Further, the radio frequency unit 1501 is further configured to trigger the establishment of a user plane session for home routing with a target network device through a non-access stratum according to a first parameter related to access of a native computing power service.

This enables the terminal to realize the native computing power service on the operator's network.

Further, the radio frequency unit 1501 is further configured to: after completing the registration process, send a computing power resource requirement to the target network device, so that the target network device generates a native computing power service strategy according to the computing power resource requirement, and allocates communication and computing power resources to the terminal; and receive the native computing power service strategy sent by the target network device.

Further, the generating, by the target network device, a native computing power service strategy according to the computing power resource requirement includes:

generating, by the target network device, a native computing power service strategy through a policy control function according to the computing power resource requirement and allocating communication and computing power resources to the terminal.

Further, the allocating communication and computing power resources to the terminal includes:

selecting, by the target network device on the movement track of the terminal, a computing power service server and a matched gateway that meet the computing power resource requirement of the terminal and that have the lowest congestion probability on the transmission path.

Further, the allocating communication and computing power resources to the terminal includes:

updating, by the target network device, the native computing power service strategy on the session management entity, so that the session management entity triggers the session management process, switches the session to an appropriate user plane function, and adjusts the transmission quality of service of the terminal.

Further, the native computing power service strategy includes: an address or an identifier of the computing power service server, a gateway address or identifier, or transmission quality of service.

The terminal is provided with the native computing power service that meets the computing power resource requirement of the terminal.

Figure 16:
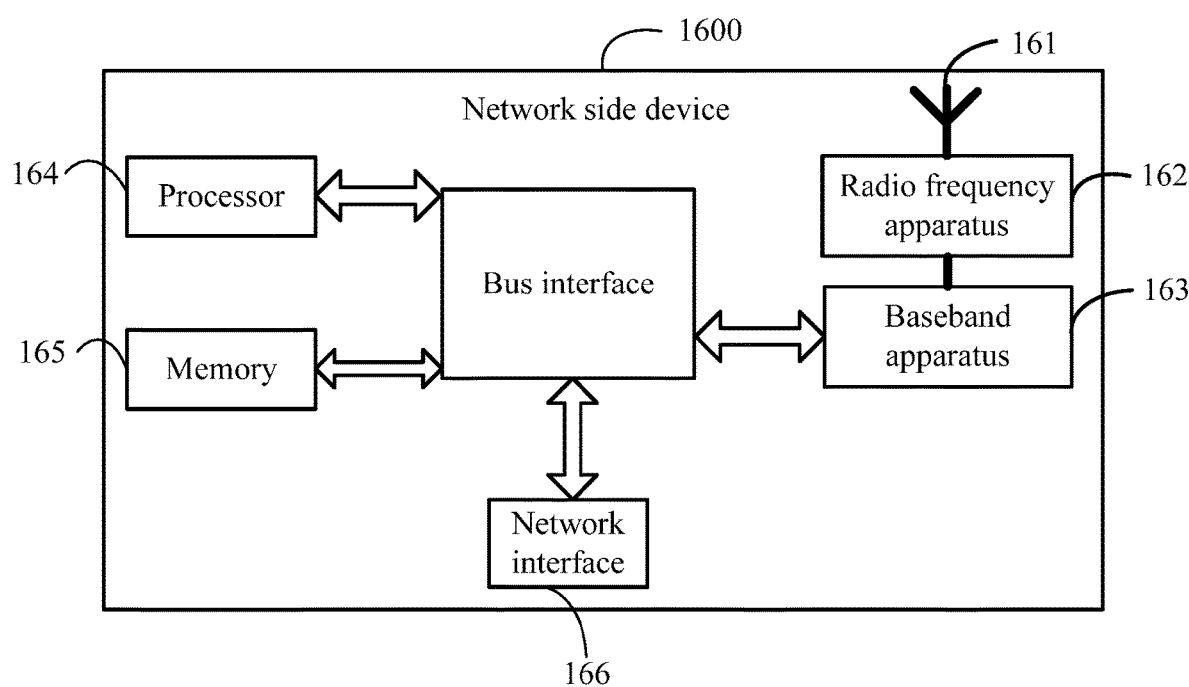
FIG. 16 is a schematic structural diagram of a network device implementing an embodiment of the present application.

An embodiment of the present application further provides a network device. As shown in FIG. 16, a network device 1600 includes an antenna 161, a radio frequency apparatus 162, and a baseband apparatus 163. The antenna 161 is connected to the radio frequency apparatus 162. In an uplink direction, the radio frequency apparatus 162 receives information through the antenna 161, and sends the received information to the baseband apparatus 163 for processing. In a downlink direction, the baseband apparatus 163 processes information to be sent and transmits the information to the radio frequency apparatus 162, and the radio frequency apparatus 162 processes the received information and then transmits the information through the antenna 161.

The foregoing band processing apparatus may be located in the baseband apparatus 163. In the foregoing embodiment, a method performed by the network device may be implemented in the baseband apparatus 163. The baseband apparatus 163 includes a processor 164 and a memory 165.

The baseband apparatus 163 may include, for example, at least one baseband board, where a plurality of chips are disposed on the baseband board. As shown in FIG. 16, one chip is, for example, the processor 164, which is connected to the memory 165, so as to invoke a program in the memory 165 to perform operations of the network device shown in the foregoing method embodiment.

The baseband apparatus 163 may further include a network interface 166, configured to exchange information with the radio frequency apparatus 162, where the interface is, for example, a common public radio interface (CPRI).

The network device in this embodiment of the present application further includes an instruction or a program that is stored in the memory 165 and that can run on the processor 164. The processor 164 invokes the instruction or the program in the memory 165 to perform the method performed by the modules shown in FIG. 13, and a same technical effect is achieved. To avoid repetition, details are not described herein.

An embodiment of the present application further provides a readable storage medium. The readable storage medium stores a program or an instruction, and when the program or the instruction is executed by a processor, the various processes of the foregoing native computing power service implementation method embodiment is performed and the same technical effects can be achieved. To avoid repetition, details are not described herein again.

The processor is a processor in the terminal in the foregoing embodiment. The readable storage medium includes a computer-readable storage medium, such as a computer read-only memory, a random access memory, a magnetic disk, an optical disc, or the like.

An embodiment of the present application further provides a chip, the chip includes a processor and a communication interface, the communication interface is coupled to the processor, and the processor is configured to run the program or instruction of the network device to realize each process of the embodiment of the native computing power service implementation method, and can achieve the same technical effect. To avoid repetition, details are not repeated herein.

It should be understood that the chip mentioned in this embodiment of the present application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of the present application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present application.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. A native computing service implementation method, executed by a target network entity, comprising:
 performing a logical interaction for a native computing service with a terminal through a user plane; and
 providing the terminal with the native computing service that meets a computing resource requirement of the terminal,
 wherein when providing the terminal with the native computing service that meets the computing resource requirement of the terminal, the target network entity is configured to implement scheduling of a computing resource on an Internet Protocol transmission platform and at least one of the following functions on the Internet Protocol transmission platform:
  performing authentication and authorization for the terminal to access the native computing service;
  negotiating computing quality of service for the native computing service; or
  charging the native computing service.

2. The method according to claim 1, wherein when providing the terminal with the native computing service that meets the computing resource requirement of the terminal, the target network entity is further configured to implement routing on the Internet Protocol transmission platform.

3. The method according to claim 1, wherein performing the native computing logical interaction with the terminal through the user plane comprises:
 establishing a user plane session with the terminal according to a first parameter related to access of the native computing service, wherein the user plane session is triggered by a non-access stratum of the terminal; and
 performing the logical interaction for the native computing service with the terminal through the user plane session, and providing the terminal with the native computing service that meets the computing resource requirement of the terminal.

4. The method according to claim 3, wherein after establishing the user plane session with the terminal, the method further comprises:
 receiving a registration request message of the native computing service sent by the terminal; and
 executing a registration process.

5. The method according to claim 4, wherein executing the registration process comprises:
 obtaining authentication information of the terminal from a subscription management functional entity, and performing authentication;
 when the authentication is successful, obtaining user data of the terminal from the subscription management functional entity; and
 performing a third-party registration with a computing service server.

6. The method according to claim 5, wherein after performing the third-party registration with the computing service server, the method further comprises:
 receiving a message from the terminal for subscribing to a registration event notification.

7. The method according to claim 3, wherein establishing the user plane session with the terminal according to the first parameter related to access of the native computing service comprises:
 establishing a user plane session for home routing with the terminal according to the first parameter related to access of the native computing service;
 wherein the first parameter is obtained by the terminal from a network side that supports the native computing service;
 wherein the first parameter comprises at least one of the following:
 an access point network name;
 data network name information;
 slice information configured by a network; or
 subscribed transmission quality of service.

8. The method according to claim 3, wherein the access request triggered by the user plane session adopts an access category corresponding to access of the native computing service; or
 wherein a default quality of service flow of the user plane session adopts a specific service requirement value identifier, and is used to transmit logical interaction for native computing service information.

9. The method according to claim 1, wherein performing the native computing logical interaction with the terminal through the user plane comprises:
 after a registration process is completed, obtaining a computing resource requirement of the terminal;
 generating a native computing service policy according to the computing resource requirement of the terminal and allocating communication and computing resources to the terminal; and
 sending the native computing service policy to the terminal.

10. The method according to claim 9, wherein generating the native computing service policy according to the computing resource requirement of the terminal and allocating communication and computing resources to the terminal comprises:
 generating the native computing service policy through a policy control function according to the computing resource requirement of the terminal and allocating communication and computing resources to the terminal.

11. The method according to claim 9, wherein generating the native computing service policy according to the computing resource requirement of the terminal comprises:
obtaining first information through an execution entity of the target network function; and
generating the native computing service policy according to the first information and the computing resource requirement of the terminal, wherein:
the first information comprises second information obtained from a transport layer and third information obtained from the native computing layer;
the second information comprises at least one of the following: transmission status information of the network, or location information and a movement track of the terminal; and
the third information comprises: computing resource distribution information of a computing service server in the network.

12. The method according to claim 9, wherein allocating communication and computing resources to the terminal comprises:
selecting, on a movement track of the terminal, a computing service server and a matched gateway that meet the computing resource requirement of the terminal and that have the lowest congestion probability on a transmission path; or
wherein the allocating communication and computing resources to the terminal comprises:
updating the native computing service policy on a session management entity, so that the session management entity triggers a session management process, switches the session to a user plane function, and adjusts a transmission quality of service of the terminal.

13. The method according to claim 12, wherein when the terminal performs the native computing service, the method further comprises:
obtaining first information through an execution entity of the target network function;
determining, according to the first information, whether a user plane session satisfies the computing resource requirement of the terminal, and
when the user plane session does not meet the computing resource requirement of the terminal, updating the native computing service policy, and adjusting to communication and computing resources allocated to the terminal.

14. The method according to claim 13, wherein updating the native computing service policy and adjusting to communication and computing resources allocated to the terminal comprises:
updating the native computing service policy through a policy control function, and adjusting to the communication and computing resources allocated to the terminal.

15. The method according to claim 9, wherein the native computing service policy comprises at least one of an address or an identifier of a computing service server, a gateway address or identifier, or transmission quality of service.

16. The method according to claim 3, wherein when the terminal performs the native computing service, the method further comprises:
interacting with a computing service server to collect charging information related to the native computing service; and
sending the charging information related to the native computing service of the terminal to a charging entity, so that the charging entity obtains a charging data record according to the charging information related to the native computing service of the terminal and charging information generated in transmission.

17. A native computing service implementation method, executed by a terminal, comprising:
performing a native computing service signaling interaction with a target network entity through a user plane, to obtain a native computing service that meets a computing resource requirement and to implement, through the target network entity, scheduling of a computing resource on an Internet Protocol transmission platform and at least one of the following functions on the Internet Protocol transmission platform:
performing authentication and authorization for the terminal to access the native computing service;
negotiating computing quality of service for the native computing service; or
charging the native computing service.

18. The method according to claim 17, wherein performing the native computing service signaling interaction with the target network entity through the user plane comprises:
triggering the establishment of a user plane session with the target network entity through a non-access stratum according to a first parameter related to access of a native computing service; and
performing the native computing service signaling interaction with the target network entity based on the user plane session.

19. The method according to claim 18, wherein after establishing the user plane session with the target network entity, the method further comprises:
sending a registration request message of the native computing service to the target network entity, so that the target network entity performs a registration process.

20. A network entity, comprising:
a memory storing a computer program; and
a processor coupled to the memory and configured to execute the computer program to perform operations comprising:
performing a logical interaction for native computing service with a terminal through a user plane, and providing the terminal with a native computing service that meets a computing resource requirement of the terminal,
wherein when providing the terminal with the native computing service that meets the computing resource requirement of the terminal, the processor of the target network entity is configured to implement scheduling of a computing resource on an Internet Protocol transmission platform and at least one of the following functions on the Internet Protocol transmission platform;
performing authentication and authorization for the terminal to access the native computing service;
negotiating computing quality of service for the native computing service; or
charging the native computing service.

* * * * *